United States Patent
Holloway et al.

(10) Patent No.: US 7,420,978 B2
(45) Date of Patent: Sep. 2, 2008

(54) METHOD AND APPARATUS FOR BILLING VOICE CALLS OVER AN INTERNET PROTOCOL NETWORK ACCORDING TO BANDWIDTH CRITERIA

(75) Inventors: J. Michael Holloway, Austin, TX (US); Samuel R. Shiffman, Austin, TX (US)

(73) Assignee: UniPoint Holdings, Inc.

( * ) Notice: Subject to any disclaimer, the term of this patent is extended or adjusted under 35 U.S.C. 154(b) by 749 days.

(21) Appl. No.: 10/696,974

(22) Filed: Oct. 30, 2003

(65) Prior Publication Data

US 2004/0136361 A1 Jul. 15, 2004

Related U.S. Application Data

(60) Provisional application No. 60/422,526, filed on Oct. 31, 2002.

(51) Int. Cl.
- *H04L 12/28* (2006.01)
- *H04L 12/56* (2006.01)
- *H04M 15/00* (2006.01)

(52) U.S. Cl. .................. 370/401; 370/352; 370/400; 379/126

(58) Field of Classification Search .......... 379/111, 379/112.01, 114.01, 114.03, 114.07, 115.01, 379/115.03, 121.01, 124; 370/352–353, 370/356, 400, 401, 404
See application file for complete search history.

(56) References Cited

U.S. PATENT DOCUMENTS

| | | | |
|---|---|---|---|
| 6,104,704 A * | 8/2000 | Buhler et al. | 370/252 |
| 6,144,727 A * | 11/2000 | Mashinsky | 379/114.02 |
| 6,363,065 B1 | 3/2002 | Thornton et al. | |
| 6,498,791 B2 * | 12/2002 | Pickett et al. | 370/353 |
| 6,600,733 B2 | 7/2003 | Deng | |
| 6,633,848 B1 | 10/2003 | Johnson et al. | |
| 6,657,957 B1 * | 12/2003 | Cheung et al. | 370/230 |
| 6,775,519 B1 * | 8/2004 | Wiedeman et al. | 455/12.1 |
| 6,914,900 B1 * | 7/2005 | Komatsu et al. | 370/356 |
| 2001/0021176 A1 * | 9/2001 | Mimura et al. | 370/235 |

(Continued)

FOREIGN PATENT DOCUMENTS

EP    1 169 873 A0    1/2002

(Continued)

OTHER PUBLICATIONS

Search Report EP 03 02 5012.

*Primary Examiner*—Binh K Tieu
(74) *Attorney, Agent, or Firm*—The Law Firm of H. Dale Langley, Jr., P.C.

(57) ABSTRACT

A telecommunication service charges for voice calls entering a network over a particular time period, such as a billing period. A parameter or parameters related to the number of information units (e.g., packets, bytes or bits) used to transmit the plurality of voice calls over the network is measured. A charge for the plurality of voice calls is computed based on the one or more parameters measured. The one or more parameters may be used to compute a charge for the plurality of voice calls based on the total number of information units transmitted, average number of information units transmitted, peak information units transmitted over the billing period or some combination thereof.

13 Claims, 1 Drawing Sheet

U.S. PATENT DOCUMENTS

| | | |
|---|---|---|
| 2002/0019829 A1 | 2/2002 | Shapiro |
| 2003/0060210 A1* | 3/2003 | Ravishankar et al. ....... 455/452 |
| 2003/0133558 A1* | 7/2003 | Kung et al. ............ 379/215.01 |
| 2004/0223490 A1* | 11/2004 | Donovan et al. ............ 370/352 |
| 2005/0130701 A1* | 6/2005 | Zendle ........................ 455/555 |
| 2005/0238154 A1* | 10/2005 | Heaton et al. .......... 379/127.01 |
| 2006/0140368 A1* | 6/2006 | Mark et al. ............ 379/114.03 |

FOREIGN PATENT DOCUMENTS

| | | |
|---|---|---|
| EP | 1 176 840 A1 | 1/2002 |
| FR | 2 830 148 A1 | 3/2003 |
| WO | WO 00/22860 A1 | 4/2000 |

* cited by examiner

METHOD AND APPARATUS FOR BILLING VOICE CALLS OVER AN INTERNET PROTOCOL NETWORK ACCORDING TO BANDWIDTH CRITERIA

RELATED APPLICATIONS

This application is a continuation in part of U.S. Provisional application Ser. No. 60/422,526, filed Oct. 31, 2002 and claims priority thereto under 35 U.S.C. 119e, and is included herein its entirely by reference.

BACKGROUND OF THE INVENTION

1. Field of the Invention

This invention relates to telephone networks and more particularly to determining cost of voice calls according to various criteria

2. Description of the Related Art

It is known that voice calls can be carried as packetized data over the Internet or some other packetized data transport network. As large packet based telephone networks emerge, there is greater likelihood that a call may originate on a telephone coupled to a publicly switched telephone network (PSTN) and have a destination on the packetized network. When a call is received into the packetized network, it is routed to the appropriate address on the network. Private packetized networks carrying voice traffic are becoming national and even international in coverage.

One problem with receiving calls from a PSTN or another network into a packetized telephone network is that a way must be found to charge for the calls appropriately. Traditionally, that has been done on a per call basis. For instance, each call entering the packetized network is charged on a per minute basis. If a large entity, such as a telephone company is the source of the calls entering the network, charging on a per call basis results in a complex billing process. For example, a telephone company may originate one hundred million calls during a particular billing period. To generate a bill on a per call basis is computationally intensive due to the large numbers of calls involved. The complexity of such a billing approach is undesirable both from the perspective of the party creating the bill as well as the party receiving the bill.

Accordingly, it would be desirable to provide a billing approach that has reduced complexity and greater flexibility.

SUMMARY OF THE INVENTION

Accordingly, the invention provides a method of charging for voice calls entering a network carrying packetized voice traffic. The method includes receiving a plurality of voice calls into the network over a particular time period, such as a billing period. A parameter or parameters related to the number of information units (e.g., packets, bytes or bits) used to transmit the plurality of voice calls over the network is measured. A charge for the plurality of voice calls is computed based on the one or more parameters measured. The one or more parameters may be used to compute a charge for the plurality of voice calls based on the total number of information units transmitted, average number of information units transmitted, peak information units transmitted over the billing period or some combination.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 1:
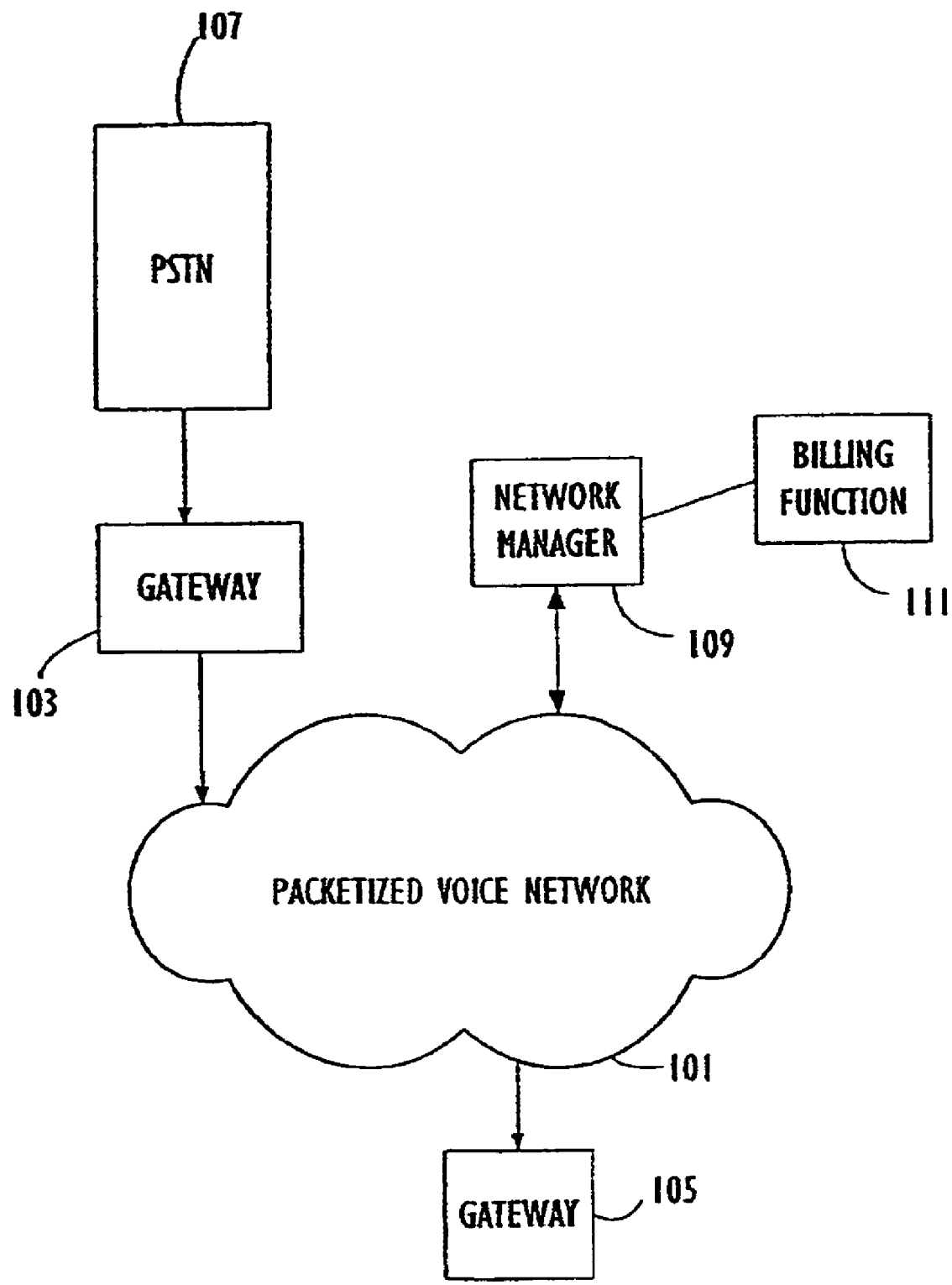
FIG. 1 is a system block diagram of a system utilizing a count of information units transmitted in a billing system according to one embodiment of the present invention.

Referring to FIG. 1, system block diagram is depicted in which the present invention can be effectively utilized. Packetized voice network 101 transmits packetized voice calls between a plurality of nodes on the network. Network 101 may be a large national or even international network that can forward packetized voice traffic over great distances. In addition, the packetized voice network 101 may include ingress and egress points shown as gateways 103 and 105 that allow calls to enter the network from other sources and to leave the network going to other sources. For example, a call may enter the network at gateway 103 and be routed to a node in the network or be routed through the network to an egress point at gateway 105 for a destination outside of a network. More particularly, a call may originate in a publicly switched telephone network (PSTN) 107 that is destined for a target that is part of network 101. If the call is originating with PSTN 107, the call on arrival at gateway 103 is converted into a packet stream suitable for transmission across packetized voice network 101. Assume that PSTN 107 provides a large number of voice calls for gateway 103 and that it is charged for the use of the packetized voice network 101.

Gateway 103 is a node on a network that forwards packets to another node on the packetized network using a TCP/IP, or other appropriate network protocol, suitable for a packetized voice network. Gateway 103, converts an analog call received from the PSTN to packets carrying the voice call. Gateway 103 identifies a target node on the voice network based on the number dialed on the PSTN and forwards packets associated with that voice call to that node.

Gateway 103 may also receive calls that are already packetized. In fact, gateway 103 may be coupled to another packetized voice network that is charged for calls entering network 101. In that case, the packetized calls are routed according to information contained in the packets received identifying the call destination.

Because a portion of what gateway 103 does is the same function as associated with traditional data networks, network management protocols may be utilized which can track information about the calls made. For instance, the Simple Network Management Protocol (SNMP) or the remote monitoring (RMON) network management protocol provide a rich set of data about network usage. The SNMP protocol provides for network management by a manager through agents that interface with the device being managed. For example, an SNMP agent may reside on gateway 103. The agents contain managed objects that include performance statistics relevant to the current invention, but can also include management of such objects as hardware or configuration parameters. The various objects are stored in a format specified by a Management Information Base (MIB). A typical agent implements the SNMP protocol, stores and retrieves management data defined by the MIB and can signal an event to the manager. A typical manager can query agents, set variables in agents, get responses from agents and otherwise perform necessary management functions. Details on the SNMP protocol are well known in the art and accordingly are not described in detail herein.

RMON (which includes presently RMON 1 and RMON 2) allows network information to be gathered at one node and defines additional MIBs to provide a more detailed data set regarding network operations. These, or other network management protocols can readily provide the necessary statistics relating to the number of packets, bytes or bits of data associated with voice calls that are sent from gateway 103 into the packetized voice network 101.

The kind of information that can be obtained includes the total number of bytes transmitted, e.g., over a predetermined period such as a day or a month. In addition, the average number of bytes can be tracked in numerous ways. For instance, the particular management/monitoring protocol utilized in the network could provide a daily total number of bytes transmitted that are associated with phone calls received from PSTN 107. If desired, those numbers could be converted to a daily average for the billing period. In addition, the peak number of bytes transmitted could also be tracked on a daily weekly or billing period basis. The peak number of bytes may be a useful billing basis since it is a statistic indicative of how close that portion of the network is to reaching unacceptable loading conditions.

If all of the traffic received into gateway 103 was not from the same telephone company or other entity, then gateway 103 could be implemented to provide statistics of how many packets were sent into the network from each source. That could be based on the calling number, with each particular calling number associated with one of the sources.

The network monitors may count bytes or packets or bits. If the packets are a fixed size in terms of bytes or if an average packet size can be determined, then it is appropriate to count packets. If packets can vary in the number of bytes they contain as they may for some protocols, then it may be appropriate to count bytes instead. In any case, a count is made of an information unit, whether that information unit is a packet or byte or bit or some other measurement of the amount of network bandwidth utilized. Thus, one of ordinary skill, given the teachings herein can readily adopt to tracking the appropriate information unit.

Once the appropriate statistics are obtained regarding the information units transmitted by gateway 103 into the packetized voice network 101 associated with a particular group of voice calls, that information is transmitted to network management node 109 which includes a billing function 111. The billing function may be a system that is wholly separate from the network management node 109 or may be one of the functions performed by network management node 109. The billing function takes the statistics provided for gateway 103 related to information units transmitted into the network associated with a group of voice calls and generates a bill based on that information. Note that the information generated by gateway 103 may be generated by an agent residing on gateway 103 which is periodically polled by network manager 109 to obtain that information in accordance with the particular network management protocol implemented.

The billing function then calculates a bill based on the information related to the information units transmitted into the network. The charges may be calculated in a number of different ways. For example, assume the time period for which a bill is being generated is one month. Other time periods can also be used, weekly, daily, etc. In one embodiment, the telephone company or other entity being billed is charged for the total number of information units transmitted into the network. That means, assuming, e.g., there are one million calls for that month, the only information that needs to be determined is how many bytes (or bits or packets) were transmitted during the period. A bill is then prepared based on the number of information units X (cost/information unit), with the cost being some fraction of a cent. That provides a very simple billing mechanism for both the sender and the receiver of the bill. In addition, the necessary statistics are readily available from information collected from network management protocols. The bill can then be forwarded to the telephone company or other entity being charged for the plurality of phone calls.

In another embodiment a peak usage rate is charged. That is, the peak usage over a certain amount period is determined and a charge made according to that peak usage. That could be a peak usage per day averaged over the monthly billing period, a peak usage during the period or various combination of average peak value calculated daily, weekly or monthly. For instance, the statistics could provide a peak usage per hour, per day, per week or per month. That information can be combined into various types of peak averages to generate a bill.

Other types of averages can also be employed to determine the appropriate amount to charge for telephone calls made during the billing period. For example, the network manager can gather the total number of information units transmitted each day of the billing period and then a daily average generated. A combination of peak and average billing can also be used. For example, one component of the charge can be based on average daily totals and another component of the charge based on average daily peak or overall peak for the period. As can be seen, various ways of determining charges based on the number of information units transmitted into the network can be utilized.

While the description herein so far has described total, average and peak rates of information units transmitted, other measures of network bandwidth utilization can also be used. For instance, bandwidth utilization could be measured in information units/second transmitted (e.g., average or peak).

The description of the invention set forth herein is illustrative, and is not intended to limit the scope of the invention as set forth in the following claims. For instance, while certain combinations of peak and average rates have been described many other combinations could be utilized as would be apparent to one of skill in the art based on the teachings herein. Other variations and modifications of the embodiments disclosed herein, may be made based on the description set forth herein, without departing from the scope and spirit of the invention as set forth in the following claims.

What is claimed is:

1. A method of charging for a voice call, the voice call comprises voice signals transmitted by a call source device and received by the call source device, comprising the steps of:

providing a packetized voice network of a plurality of communicatively interconnected nodes, each node capable of communicating to and from each other node of the plurality;

connecting a gateway to the call source device and to the packetized voice network, wherein the gateway comprises at least one of the plurality of communicatively interconnected nodes;

linking the voice call through the gateway, to the call source device and an intended recipient, throughout duration of the voice call;

converting, at the gateway, the voice signals transmitted by the call source device for the voice call to a packetized digital data representative of the voice signal, if not received at the gateway as the packetized digital data;

determining, via the gateway, a number characteristic of the packetized digital data representative of the voice signals transmitted by the call source device to the gateway;

obtaining the number from the gateway; and preparing a bill for the voice call based on the number from the step of obtaining.

2. The method of claim 1, wherein the packetized voice network communicates a plurality of distinct different voice calls initiated external to the packetized voice network, linked to the packetized voice network through the gateway, at least certain of the plurality can, but need not necessarily, be transmitted by a different respective call source device.

3. The method of claim 2, wherein the step of obtaining is performed, respectively, for each respective call source device for a predetermined period, and the step of preparing further comprising the step of:

aggregating the number for each respective call source device over the predetermined period to obtain a respective result for each respective call source device for the predetermined period;

invoicing, respectively, for each respective call source device in accord with the respective result.

4. The method of claim 1, wherein the packetized voice network communicates the packetized voice signal among respective ones of the plurality of nodes via voice over internet protocol (VOIP).

5. The method of claim 1, wherein the step of determining the number employs a network management protocol aspect and the step of obtaining includes communication of digital data representative of the number.

6. The method of claim 1, wherein the voice calls include modem calls.

7. The method of claim 1, wherein the gateway is communicatively coupled to a public switched telephone network to receive the voice signals transmitted by the call source device for the voice call.

8. The method of claim 1, wherein the gateway is also communicatively coupled to a second packetized data network that is not the packetized voice network.

9. The method of claim 1, wherein the step of preparing the bill employs a component selected from the group consisting of: the number, an average of the number during a time period, and a peak of the number over time.

10. A computer program product encoded in at least one computer readable medium to implement a billing program for a packetized network carrying voice traffic, the voice traffic comprised of digital data units corresponding to voice calls initiated external to the packetized network and input to the packetized network via a gateway to the packetized network, the gateway links the respective voice calls through the gateway throughout duration of the voice calls, the packetized network comprises a plurality of intercommunicative nodes, comprising:

a first instruction sequence executable to obtain from the gateway of the packetized network a measure of network utilization associated with a respective one of the voice calls throughout duration of the respective one made through the gateway, the measure relating to a number of the digital data units comprising the respective one of the voice calls; and a second instruction sequence executable to determine a charge in respect of the number.

11. The computer program product of claim 10, wherein the measure is a function of an average of the number over a period of time.

12. The computer program product of claim 10, wherein the measure is a function of a peak of the number during a period of time.

13. A method of charging for a voice call, the voice call is initiated by a device communicatively connected to a call node of a packetized voice network comprised of a plurality of intercommunicating nodes, the call node is capable of communicating a packetized voice signal of packetized digital data representative of the voice call among the plurality of nodes, comprising the steps of:

connecting the voice call through the call node to the packetized voice network;

linking the voice call through the call node throughout duration of the voice call;

determining, via the packetized voice network, a number of individual digitized information units of the packetized voice signal;

connecting the call node to a gateway to the packetized voice network of a call recipient device, the gateway capable to deliver the voice call, received by the gateway from the call node over the packetized voice network, to the call recipient device;

converting the packetized voice signal received at the gateway, to a voice signal understandable by the call recipient device, prior to delivery of the voice call to the call recipient device, if not otherwise understandable by the call recipient device; and preparing a bill for the voice call based on the number.

* * * * *